(12) United States Patent
Hwang et al.

(10) Patent No.: US 8,625,979 B2
(45) Date of Patent: Jan. 7, 2014

(54) LENS BARREL AND PHOTOGRAPHING APPARATUS COMPRISING THE SAME

(75) Inventors: Young-jae Hwang, Suwon-si (KR); Kwang-seok Byon, Yongin-si (KR); Jung-soo Kim, Suwon-si (KR); Chi-young Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 13/017,209

(22) Filed: Jan. 31, 2011

(65) Prior Publication Data

US 2011/0188840 A1  Aug. 4, 2011

(30) Foreign Application Priority Data

Feb. 1, 2010 (KR) .................. 10-2010-0009153

(51) Int. Cl.
*G03B 17/00* (2006.01)
(52) U.S. Cl.
USPC .......................... 396/55; 348/208.7

(58) Field of Classification Search
USPC .......................... 396/55; 348/208.7
See application file for complete search history.

(56) References Cited

U.S. PATENT DOCUMENTS

| | | | |
|---|---|---|---|
| 5,398,132 A * | 3/1995 | Otani | 359/557 |
| 2007/0127904 A1 * | 6/2007 | Iwasaki et al. | 396/55 |
| 2009/0269046 A1 * | 10/2009 | Yamazaki et al. | 396/55 |
| 2010/0245603 A1 * | 9/2010 | Hashi et al. | 348/208.5 |

* cited by examiner

*Primary Examiner* — Rodney Fuller
*Assistant Examiner* — Linda B Smith
(74) *Attorney, Agent, or Firm* — Drinker Biddle & Reath LLP (57) ABSTRACT

A lens barrel and a photographing apparatus comprising the lens barrel include: a lens module that comprises at least one lens and moves along an optical axis of the at least one lens; a shake correction module arranged near the lens module; at least one fixing member that is disposed between the lens module and the shake correction module and fixes the shake correction module in response to being pressed by the lens module; a frame on which the at least one fixing member is installed; and at least one elastic member that elastically mounts the at least one fixing member on the frame.

22 Claims, 11 Drawing Sheets

LENS BARREL AND PHOTOGRAPHING APPARATUS COMPRISING THE SAME

CROSS-REFERENCE TO RELATED PATENT APPLICATION

This application claims the priority benefit of Korean Patent Application No. 10-2010-0009153, filed on Feb. 1, 2010, in the Korean Intellectual Property Office, the disclosure of which is incorporated herein in its entirety by reference.

BACKGROUND

1. Field of the Invention

Embodiments relate to a photographing apparatus, and more particularly, to a photographing apparatus comprising a shake correction module.

2. Description of the Related Art

A photographing apparatus takes photographs of an object. Recently, photographing apparatuses such as digital still cameras and digital video cameras are widely used.

A photographing apparatus generally includes an optical system including a lens unit, an imaging device disposed near the lens unit, an image processing unit that processes electrical signals received from the imaging device, and a memory for storing captured images.

A conventional photographing apparatus is operated as follows. When a photograph is taken, light corresponding to an image of an object is transmitted through the optical system and onto the imaging device, which may be a charge-coupled device (CCD). Accordingly, the imaging device transforms the incident image light into an electrical signal, the image processing unit processes the image signal, and then the memory stores the photographed image.

Recently, in order to prevent a reduction in definition with respect to an image due to shaking or an external impact, a shake correction module is employed in a photographing apparatus.

A conventional shake correction module generally adopts an electronic shake correction method or an optical shake correction method.

The electronic shake correction method produces an un-shaken image by electronically controlling locations and colors of the image after detecting shaking from a result of the image.

The optical shake correction method produces an un-shaken image by moving the lens or the imaging device in directions which offset shaking of the photographing apparatus.

The optical shake correction method is superior to the electronic shake correction method in that the optical shake correction method does not generate an afterimage, performs a zooming operation without difficulty, and generates clean images, and thus is widely used.

The shake correction technique of photographing apparatuses is continuously developed, and high performance shake correction modules are continuously being developed to meet market requirements.

SUMMARY

To address the above and/or other problems, embodiments include a lens barrel that fixes a shake correction module when a lens module is received in the lens barrel, and a photographing apparatus comprising the lens barrel.

According to an embodiment, a lens barrel comprises: a lens module that comprises at least one lens and moves along an optical axis of the at least one lens; a shake correction module arranged near the lens module; at least one fixing member that is disposed between the lens module and the shake correction module and fixes the shake correction module in response to being pressed by the lens module; a frame on which the at least one fixing member is installed; and at least one elastic member that elastically mounts the at least one fixing member on the frame.

The lens barrel may further comprise a lens module moving device that moves the lens module and a control unit that controls the lens module moving device.

The shake correction module may comprise a shake correction lens.

The shake correction module may comprise an imaging device.

At least one groove in which the at least one fixing member is inserted may be formed on a portion of the shake correction module that contacts the at least one fixing member.

The shake correction module may comprise at least one first inclined surface on a portion of the shake correction module that contacts the at least one fixing member, and the at least one fixing member may comprise a second inclined surface on a portion of the at least one fixing member that contacts the at least one first inclined surface.

The at least one fixing member may have a cylindrical shape.

The at least one fixing member may comprise a contact member on a portion of the at least one fixing member that contacts the shake correction module.

A first end of the at least one elastic member may be installed on the at least one fixing member and a second end of the at least one elastic member may be installed on the frame.

The frame may comprise at least one installation groove into which the at least one fixing member is inserted.

According to another embodiment, a photographing apparatus comprises: a lens module that comprises at least one lens and moves along an optical axis of the at least one lens; a shake correction module arranged near the lens module; at least one fixing member that is disposed between the lens module and the shake correction module and fixes the shake correction module in response to being pressed by the lens module; a frame on which the at least one fixing member is installed; at least one elastic member that elastically mounts the at least one fixing member on the frame; a lens module moving device that moves the lens module; a control unit that controls the lens module moving device; and an imaging device disposed where image light forms an image after passing through the lens module.

The shake correction module may comprise a shake correction lens.

The shake correction module may comprise the imaging device.

At least one groove in which the at least one fixing member is inserted may be formed on a portion of the shake correction module that contacts the at least one fixing member.

The shake correction module may comprise at least one first inclined surface on a portion of the shake correction module that contacts the at least one fixing member, and the at least one fixing member may comprise a second inclined surface on a portion of the at least one fixing member that contacts the at least one first inclined surface.

The at least one fixing member may have a cylindrical shape.

The at least one fixing member may comprise a contact member on a portion of the at least one fixing member that contacts the shake correction module.

A first end of the at least one elastic member may be installed on the at least one fixing member and a second end of the at least one elastic member may be installed on the frame.

The frame may comprise at least one installation groove into which the at least one fixing member is inserted.

BRIEF DESCRIPTION OF THE DRAWINGS

The above and other features and advantages will become more apparent by describing in detail exemplary embodiments with reference to the attached drawings in which.

DETAILED DESCRIPTION

Exemplary embodiments will now be described more fully with reference to the accompanying drawings. Like reference numerals are used to indicate elements that are substantially identical, and thus the detailed description thereof will not be repeated.

Figure 1:
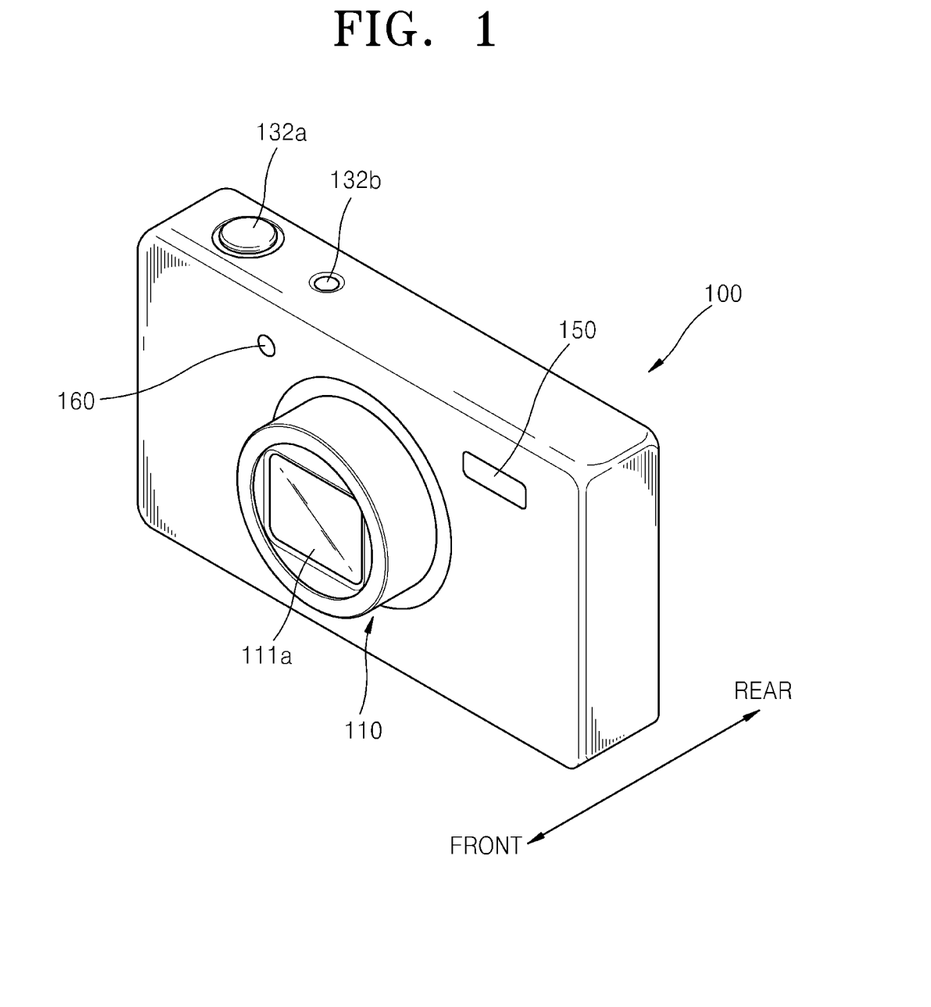
FIG. 1 is a perspective view of a photographing apparatus in which a lens module protrudes out from a front of the photographing apparatus, according to an embodiment.
Figure 2:
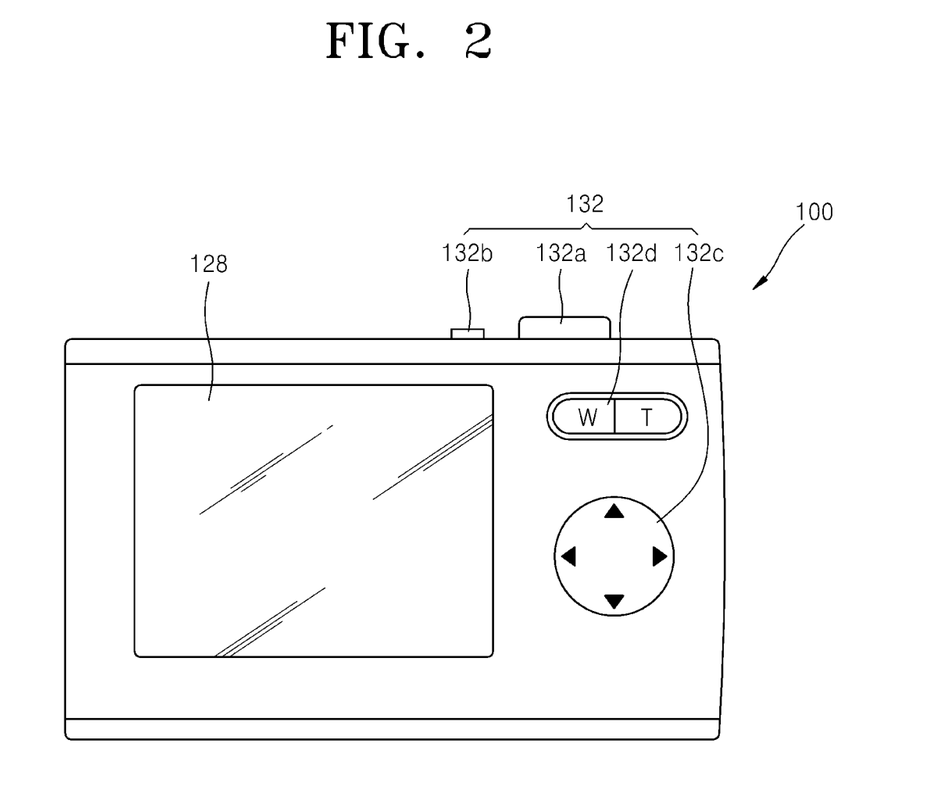
FIG. 2 is a rear view of the photographing apparatus of FIG. 1, according to an embodiment.
Figure 3:
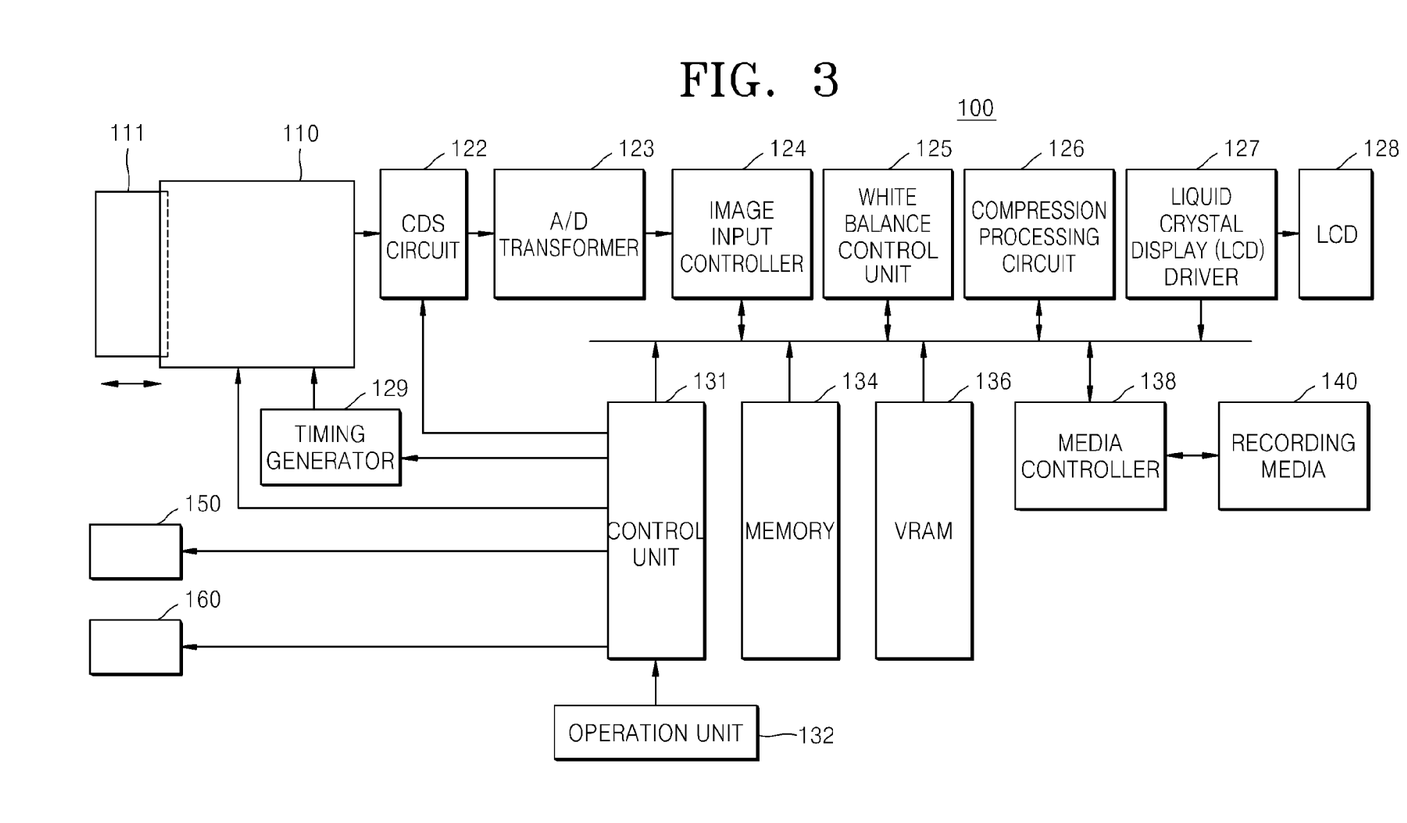
FIG. 3 is a block diagram showing a configuration of a photographing apparatus, according to an embodiment.
Figure 4:
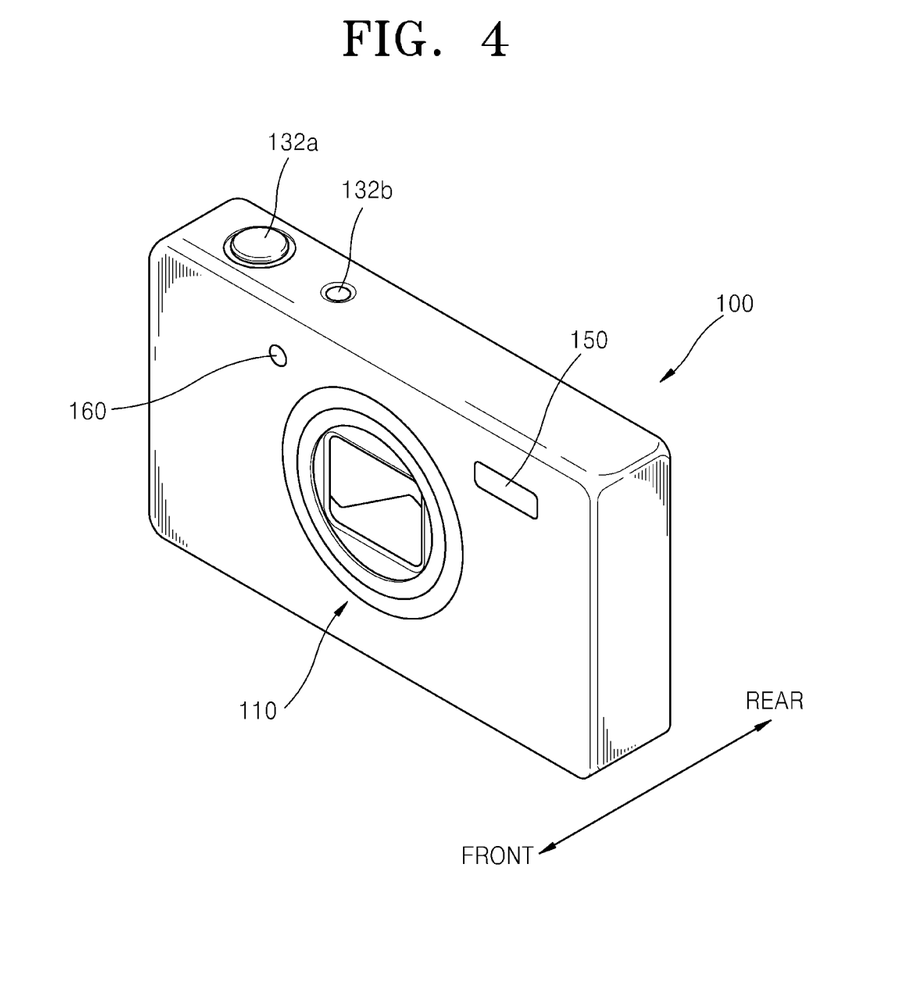
FIG. 4 is a perspective view of the photographing apparatus of FIG. 1 in which the lens module is received in a lens barrel, according to an embodiment.
Figure 5:
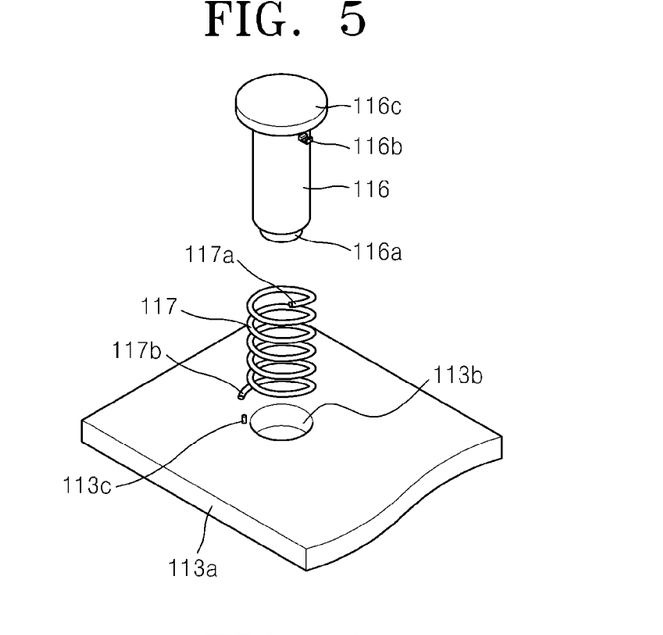
FIG. 5 is an exploded perspective view of a fixing member that is mounted on a frame by an elastic member, according to an embodiment.
Figure 6:
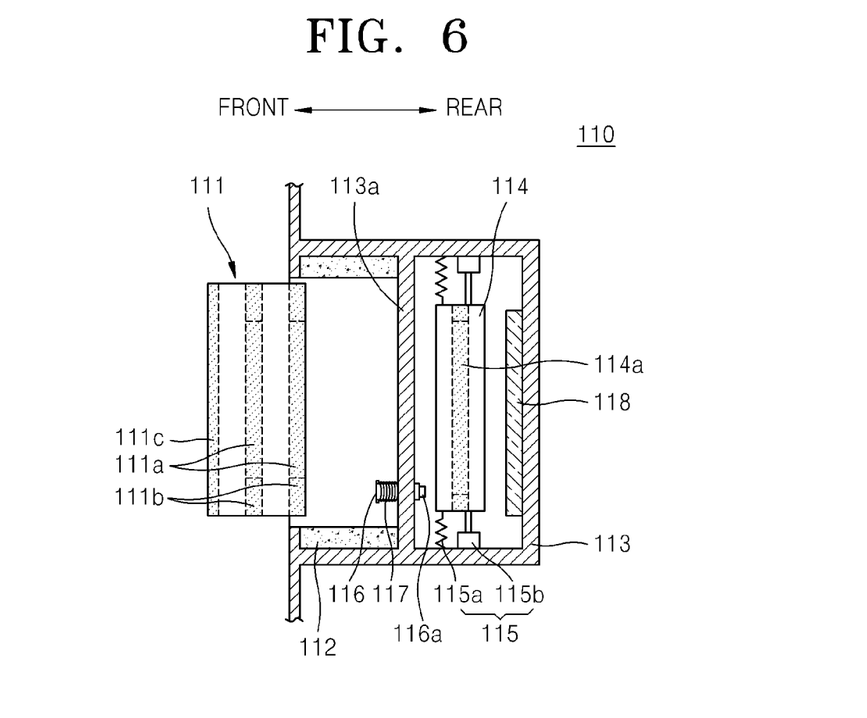
FIG. 6 is an enlarged schematic cross-sectional view of the lens barrel of the photographing apparatus of FIG. 1, according to an embodiment.
Figure 7:
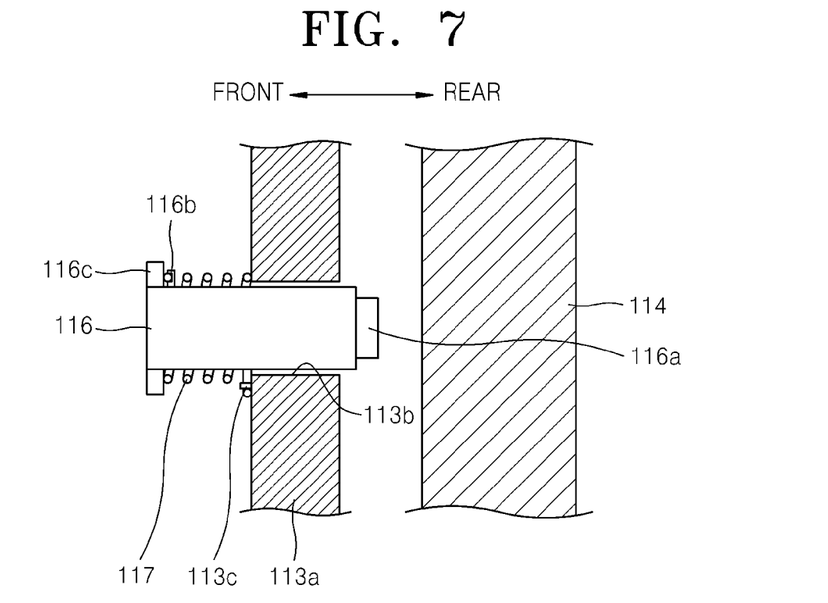
FIG. 7 is an enlarged cross-sectional view of the fixing member of FIG. 5 and a shake correction module of FIG. 6, according to an embodiment.
Figure 10:
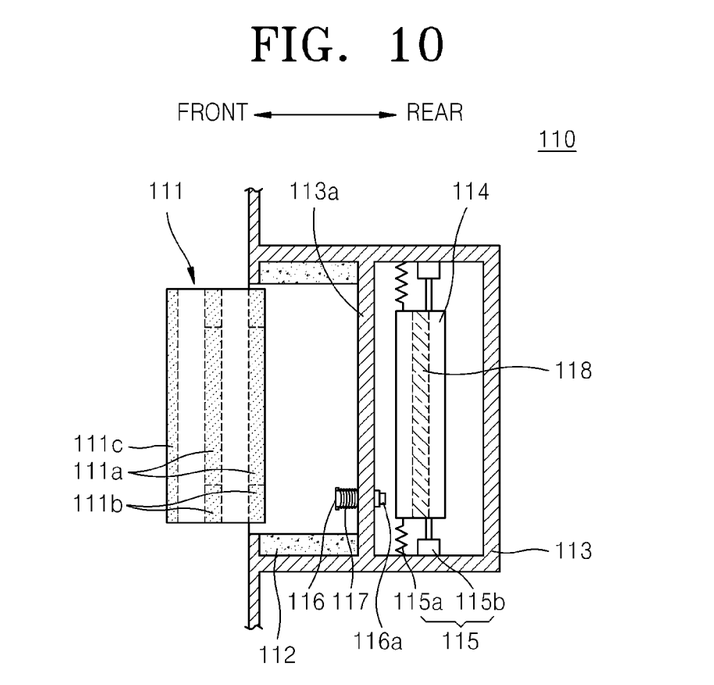
FIG. 10 is a schematic cross-sectional view of a shake correction module, according to another embodiment.

FIG. 1 is a perspective view of a photographing apparatus 100 in which a lens module 111 protrudes out from a front of the photographing apparatus 100, according to an embodiment. FIG. 2 is a rear view of the photographing apparatus 100 of FIG. 1, according to an embodiment. FIG. 3 is a block diagram showing an configuration of the photographing apparatus 100, according to an embodiment. FIG. 4 is a perspective view of the photographing apparatus 100 of FIG. 1 in which the lens module 111 is received in a lens barrel 110, according to an embodiment. FIG. 5 is an exploded perspective view of a fixing member 116 that is mounted on a frame 113 by an elastic member 117, according to an embodiment. FIG. 6 is an enlarged schematic cross-sectional view of the lens barrel 111 of the photographing apparatus of FIG. 1, according to an embodiment. FIG. 7 is an enlarged cross-sectional view of the fixing member 116 of FIG. 5 and a shake correction module 114 of FIG. 6, according to an embodiment. FIG. 10 is a schematic cross-sectional view of a shake correction module 114, according to another embodiment The photographing apparatus 100 according to an embodiment is a compact digital camera, and a lens unit and a main body unit of the photographing apparatus 100 are coupled in a manufacturing process.

The photographing apparatus 100 according to an embodiment is a compact digital camera, but is not limited thereto. That is, the photographing apparatus 100 is not limited to any specific type. For example, the photographing apparatus 100 according to an embodiment may be any of various photographing apparatuses such as a single-lens reflex camera having a detachable lens or an image camcorder.

Referring to FIGS. 1 through 3, the photographing apparatus 100 includes the lens barrel 110 having the lens module 111, a correlated double sampling (CDS) circuit 122, an analogue/digital (A/D) transformer 123, an image input controller 124, a white balance control unit 125, a compression processing circuit 126, a liquid crystal display (LCD) driver 127, an LCD 128, a timing generator 129, a control unit 131, an operation unit 132, a memory 134, a video random access memory (VRAM) 136, a media controller 138, a recording media 140, a flash 150, and an auxiliary light emitting device 160.

Referring to FIG. 6, the lens barrel 110 includes the lens module 111, a lens module driving unit 112, the frame 113, the shake correction module 114, a shake correction module driving unit 115, the fixing member 116, the elastic member 117, and an imaging device 118.

The lens module 111 functions to transmit an image light of an object, and includes lenses 111a and a lens holder 111b. A lens cap assembly 111c is disposed in front of the lenses 111a.

In the current embodiment, the lens module 111 includes two lenses 111a, but this is not to be construed as limiting.

That is, there is no specific limitation on the number of lenses that may be disposed in the lens module 111 according to various embodiments.

The lens cap assembly 111c may open or close an optical path to control passing of image light through the lenses 111a.

The lens module 111 is configured to move along an optical axis. For this purpose, the lens module driving unit 112 is mounted on the frame 113.

The lens module driving unit 112 is configured to move the lens module 111 forward or backward along the optical axis.

The lens module driving unit 112 may include a driving motor (not shown) and a driving structure (not shown) for moving the lens module 111 by receiving power from the driving motor. The driving motor may be a step motor, a voice coil motor, or a piezo motor. The driving structure may be a rack-pinion system, a rotational screw structure, a linear sliding structure, or a cam structure. Since techniques for moving the lens module 111 are well known in the art, detailed descriptions thereof will be omitted.

The frame 113 maintains the shape of the lens barrel 110 and accommodates the lens module 111, the shake correction module 114, and the imaging device 118. Also, the lens module driving unit 112, the shake correction module driving unit 115, the fixing member 116, and the elastic member 117 are mounted on the frame 113.

The shake correction module 114 corrects for an image shake caused by shaking the photographing apparatus 100. In the current embodiment, the shake correction module 114 adopts a lens shift method in which an image shake is compensated for by moving a correction lens 114a.

In the current embodiment, the shake correction module 114 corrects an image shake by using a correction lens 114a; however, this is not to be construed as limiting. That is, the shake correction module 114 may correct an image shake by moving the imaging device 118. In this case, as shown in FIG. 10, the imaging device 118 is disposed in the shake correction module 114 instead of the correction lens 114a.

The shake correction module 114 is driven by the shake correction module driving unit 115, and the shake correction module driving unit 115 includes an elastic supporting unit 115a and an actuator 115b.

The elastic supporting unit 115a is formed of a spring and elastically mounts the shake correction module 114 on the frame 113. When a shake correction operation is completed, the elastic supporting unit 115a returns the shake correction module 114 to its initial position.

The actuator 115b offsets image shaking by moving the shake correction module 114 in directions opposite to directions in which shaking occurs in response to receiving a signal from the control unit 131.

The fixing member 116 is disposed between the lens module 111 and the shake correction module 114, and temporarily fixes the shake correction module 114 in response to being pressed by the lens module 111 when the lens module 111 is received in the lens barrel 110.

The fixing member 116 has a cylindrical shape, and a contact member 116a is mounted on an end of the fixing member 116. The contact member 116a may be formed of a material that has high elasticity and can generate a high friction with respect to a contact surface. For example, the material may be synthetic rubber, urethane, or epoxy.

In the current embodiment, the lens barrel 110 includes a single fixing member 116; however, this is not to be construed as limiting. That is, there is no specific limitation in the numbers of the fixing members 116 that may be included. For example, the lens barrel 110 may include 2 or 3 fixing members 116.

The fixing member 116 according to the present embodiment has a cylindrical shape; however, this is not to be construed as limiting. That is, the fixing member 116 may not have a cylindrical shape. For example, the fixing member 116 may have a tetragonal column shape or a hexagonal column shape.

The fixing member 116 according to the present embodiment has the contact member 116a at an end of the fixing member 116; however, this is not to be construed as limiting. That is, the fixing member 116 may not have the contact member 116a.

The fixing member 116 is installed on a portion 113a of the frame 113 located between the lens module 111 and the shake correction module 114. For this purpose, an installation groove 113b into which the fixing member 116 may be inserted is formed in the portion 113a of the frame 113, and the fixing member 116 is configured to be able to move along the installation groove 113b.

The fixing member 116 is elastically mounted on the frame 113 by the elastic member 117. As shown in FIG. 5, the elastic member 117 has a cylindrical coil shape. A first end 117a of the elastic member 117 is mounted on a protrusion unit 116b of the fixing member 116 and a second end 117b of the elastic member 117 is mounted on a mounting unit 113c of the frame 113. When the fixing member 116 is mounted on the frame by the elastic member 117, the fixing member 116 is inserted into the install groove 113b. The fixing member 116 includes an elastic member supporting unit 116c. The elastic member supporting unit 116c is formed along an external circumference of the fixing member 116 and is formed to receive an elastic force from the elastic member 117.

The elastic member 117 according to the present embodiment has a cylindrical coil spring shape; however, this is not to be construed as limiting. That is, there is no specific limitation on the shape and material of the elastic member 117.

The imaging device 118 is disposed where image light forms the image after passing through the lens module 111. The imaging device 118 transforms the formed image into an electrical signal.

The imaging device 118 according to the present embodiment is a charge-coupled device (CCD); however, this is not to be construed as limiting. That is, the imaging device 118 may be a complementary metal oxide semiconductor (CMOS) or other image sensor.

Although not shown, the lens barrel 110 may include a zoom lens, a focusing lens, an iris, and a shutter.

The CDS circuit 122 includes a correlated double sampling (CDS) circuit, which is a kind of sampling circuit that removes noise from an electrical signal output from the imaging device 118. The CDS circuit 122 also includes an amp that amplifies the electrical signal after the noise is removed therefrom. The correlated double sampling circuit and the amp may be formed in one unit in the CDS circuit 122. In the current embodiment, the CDS circuit 122 is formed having a CDS circuit and an amp formed in one unit; however, the CDS circuit may be formed separately from the amp.

The A/D transformer 123 transforms an analogue electrical signal generated from the imaging device 118 or CDS circuit 122 into a digital signal.

The image input controller 124 receives the digital signal from the A/D transformer 123 and transmits a digital image signal to the controller 131.

The white balance control unit 125 is a circuit that controls a white balance using photographing image data output from the imaging device 118.

The white balance control unit 125 according to the present embodiment is configured as a circuit separate from the control unit 131; however, this is not to be construed as limiting. That is, the white balance control unit 125 may be configured as a part of the control unit 131.

The white balance control unit 125 according to the present embodiment is configured as an electrical circuit; however, this is not to be construed as limiting. That is, the white balance control unit 125 may be configured as software.

The compression processing circuit 126 compresses data corresponding to a captured image by using an appropriate compression method. The compression format may be a reversible compression format or an irreversible compression format. Examples of appropriate compression formats may be a joint photographic experts group (JPEG) format and a JPEG 2000 format.

The LCD 128 is a display unit. On the LCD unit 128, a live view before performing a photographing operation, a screen setting of the photographing apparatus 100, or a captured image is displayed. The displaying of an image or information about the photographing apparatus 100 on the LCD 128 is performed by operating the LCD driver 127.

In the current embodiment, the LCD 128 is used as a display unit; however, this is not to be construed as limiting. That is, the display unit may be an organic light emitting diode (OLED) display or a field emission display (FED).

The timing generator 129 inputs a timing signal to the imaging device 118. The timing signal generated by the timing generator 129 determines a shutter speed. That is, the imaging device 118 is driven according to the timing signal generated by the timing generator 129. Thus, when an image is input to the photographing apparatus 100 while the imaging device 118 is being driven, an electrical signal as a basis of image data is generated.

The control unit 131 generates and transmits signal commands to the imaging device 118, the timing generator 129, or the CDS circuit 122, or generates operational commands corresponding to an input operation by the operation unit 132. In the current embodiment, the photographing apparatus 100 includes only one control unit 131; however, the signal commands may be generated by one control unit and the operational commands may be generated by another control unit.

The control unit 131 performs an image processing function. That is, the control unit 131 typically performs gamma correction on the captured data transmitted from the imaging device 118. The gamma correction denotes coding of information to match the non-linearity of human eyes. That is, since human eyes react non-linearly with respect to brightness, according to Weber's law, when a limited bit depth is given, posterization is caused if the brightness of light is linearly recorded. Therefore, in order to display a high quality image having a given bit depth, image information must be coded using a non-linear transfer function. This performance is referred to as gamma correction.

The control unit 131 performs gamma correction on an input image signal according to a gamma curve. For example, the control unit 131 performs gamma correction on an input image signal having 12 bit brightness levels to generate a signal having 8 bit brightness levels.

The operation unit 132 functions as a photographing mode selection unit, and includes members for operating the photographing apparatus 100 and settings for taking photos. As shown in FIG. 2, the members included in the operation unit 132 may be a shutter button 132a for initiating a photographing operation, a power button 132b, a selection button 132c for selecting a photographing mode or a photographing driver mode and setting an effect parameter, and a zoom button 132d for controlling a zoom operation.

In FIGS. 1 and 2 according to the current embodiment, as an example, the operation unit 132 is depicted as the shutter button 132a, the power button 132b, the selection button 132c, and the zoom button 132d. However, other buttons and operational keys may be included in the operation unit 132.

The memory 134 is an example of an image memory unit, and temporarily stores image data or data required for operations. The memory 134 has a memory capacity that is sufficient to store a plurality of images. Reading and writing of an image from and into the memory 134 is controlled by the image input controller 124.

The VRAM 136 maintains contents of images displayed on the LCD 128. The resolution and the maximum display color of the LCD 128 depend on the capacity of the VRAM 136.

The recording media 140 is an example of an image recorder, and records captured images. The input and output of images to and from the recording media 140 are controlled by the media controller 138. The recording media 140 may be a card type data recording memory such as a secure digital card (SDC) or a multimedia card (MMC).

The flash 150 instantly generates a flash of light when photographing in a dark place. The flash 150 is used in a flash mode such as an auto-flash mode, a forced lighting mode, a light prohibited mode, a red-eye prevention mode, or a slow synchronization mode.

The auxiliary light emitting device 160 radiates auxiliary light onto an object so that the photographing apparatus 100 can automatically focus rapidly and correctly on the object when the amount of light from the object is not enough or photos are taken at night.

An operation of temporarily fixing the shake correction module 114 of the photographing apparatus 100 by using the fixing member 116 according to an embodiment will now be described with reference to FIGS. 6 through 9.

Figure 8:
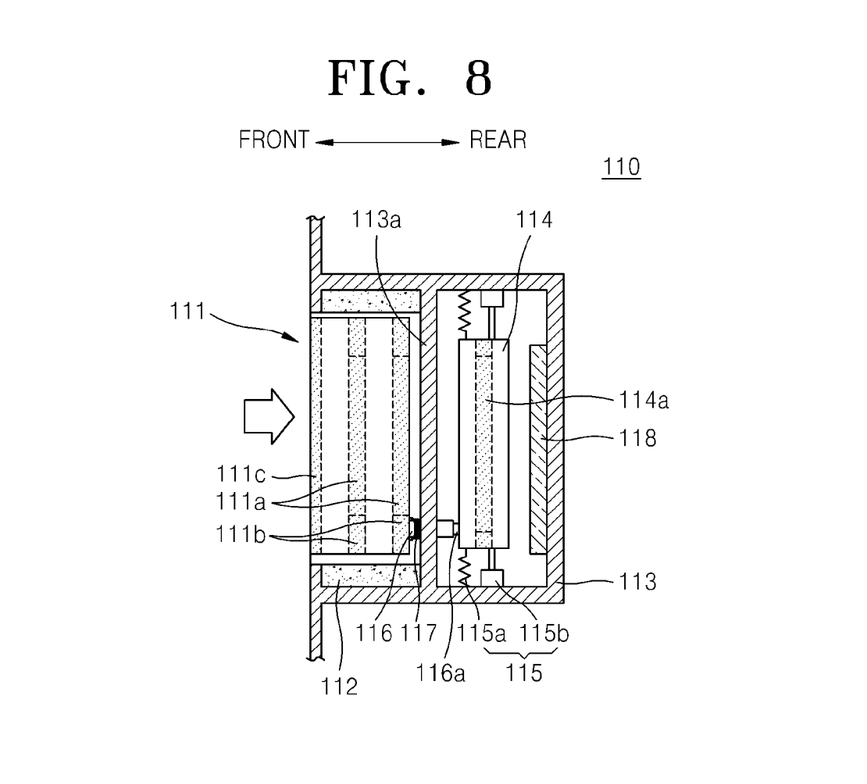
FIG. 8 is an enlarged cross-sectional view of the lens barrel of the photographing apparatus of FIG. 4, according to an embodiment.
Figure 9:
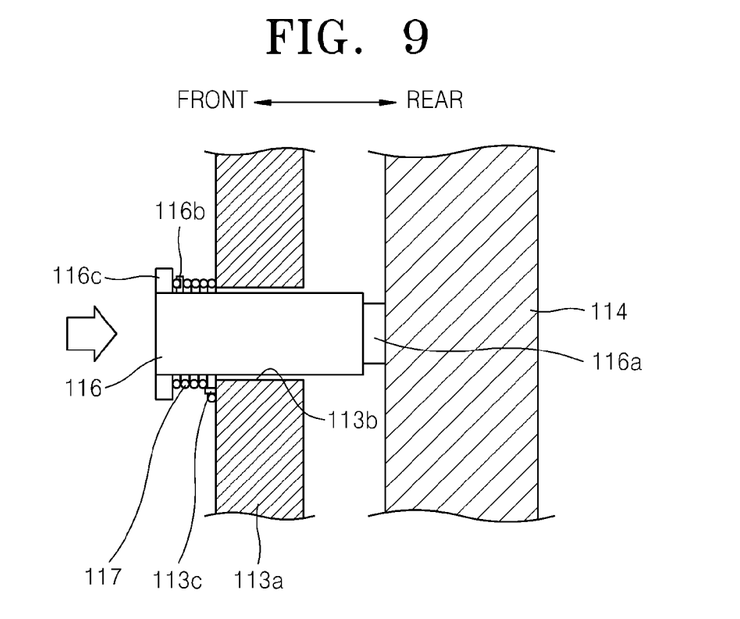
FIG. 9 is an enlarged cross-sectional view of the fixing member and the shake correction module of FIG. 8, according to an embodiment.

FIG. 8 is an enlarged cross-sectional view of the lens barrel 110 of the photographing apparatus 100 of FIG. 4, according to an embodiment. FIG. 9 is an enlarged cross-sectional view of the fixing member 116 and the shake correction module 114 of FIG. 8, according to an embodiment.

When the power button 132b of the photographing apparatus 100 is pressed, the photographing apparatus 100 is in an "ON" state. Then, the control unit 131 moves the lens module 111 forward along the optical axis toward the front of the photographing apparatus 100 by operating the lens module driving unit 112. In this case, the control unit 131 also controls the lens cap assembly 111c to open an optical path so that the photographing apparatus 100 may be in a photographing ready-state.

In this case, as depicted in FIGS. 1 and 6, the lens module 111 protrudes out from the front of the photographing apparatus 100, and the lens module 111 is separated from the fixing member 116. In this case, as depicted in FIG. 7, the fixing member 116 and the shake correction module 114 are separated from each other. In this state, if the photographing apparatus 100 is in a shake correction mode, an image shake is compensated for by operating the shake correction module 114.

When the power button 132b is pressed again to power down the photographing apparatus 100, the photographing apparatus 100 is in an "OFF" state. Then, the control unit 131 moves the lens module 111 backward along the optical axis toward the rear of the photographing apparatus 100 by operating the lens module driving unit 112, and then the lens cap assembly 111c closes the optical path.

In this case, as depicted in FIGS. 4 and 8, the lens module 111 moves in a rear direction of the lens module 111 toward an inner side of the lens barrel 110, and presses the fixing member 116. At this point, the elastic member 117 is compressed and the fixing member 116 presses the shake correction module 114, and thus the shake correction module 114 is temporarily fixed. As depicted in FIG. 9, the contact member 116a of the fixing member 116 presses against the shake correction module 114, and thus the shake correction module 114 is temporarily fixed due to friction between the contact member 116a and the shake correction module 114.

When the fixing member 116 temporarily fixes the shake correction module 114, even if the photographing apparatus 100 is shaken, the shake correction module 114 is prevented from vibrating and making any noise since the shake correction module 114 is fixed by the fixing member 116. Also, damage caused by excessively shaking the shake correction module 114 can be prevented.

When the power button 132b of the photographing apparatus 100 is pressed again to power on the photographing apparatus 100, the photographing apparatus 100 is in the "ON" state. Then, as described above, the lens module 111 moves forward along the optical axis toward the front of the photographing apparatus 100. In this case, a force pressing on the fixing member 116 is removed, the potential energy of the compressed elastic member 117 is transformed into kinetic energy, and then the fixing member 116 returns to its original position. As a result, the contact between the fixing member 116 and the shake correction module 114 is released.

As described above, the lens barrel 110 according to the present embodiment and the photographing apparatus 100 having the lens barrel 110 may prevent the shake correction module 114 from making noise and vibrating when the photographing apparatus 100 is shaking and may prevent the shake correction module 114 from being out of order due to excessive shaking of the photographing apparatus 100.

A fixing member 216 and a shake correction module 214 according to another embodiment will now be described with reference to FIGS. 11 through 14; however, mainly differences from the previous embodiment will described.

Figure 11:
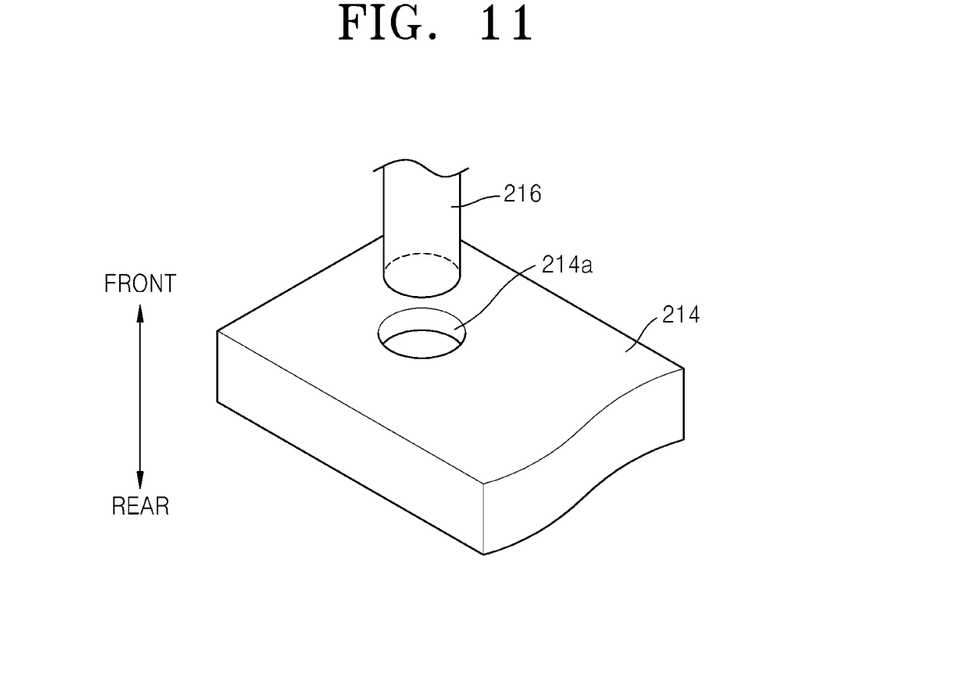
FIG. 11 is an enlarged perspective view of a fixing member and a shake correction module separated from each other due to the lens module of FIG. 1 protruding out from the front of the photographing apparatus, according to another embodiment.
Figure 12:
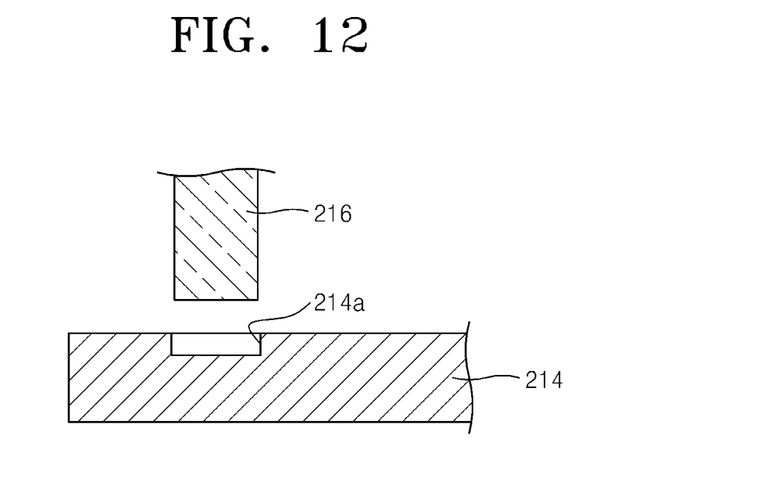
FIG. 12 is a cross-sectional view of the fixing member and the shake correction module of FIG. 11, according to an embodiment.
Figure 13:
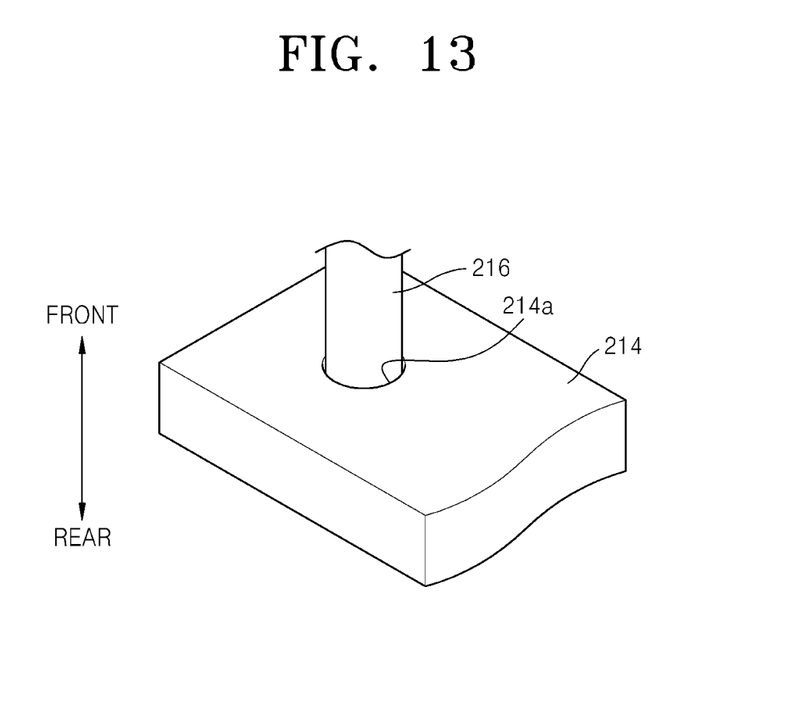
FIG. 13 is an enlarged perspective view of the fixing member contacting the shake correction module due to the lens module being received in the lens barrel, according to another embodiment.
Figure 14:
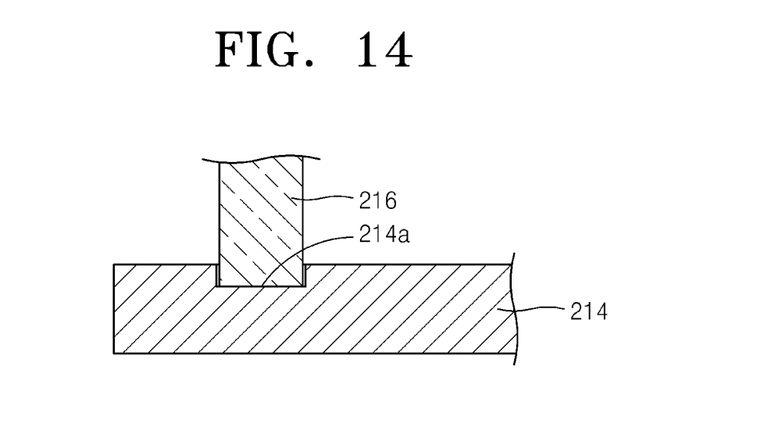
FIG. 14 is a cross-sectional view of the fixing member and the shake correction module of FIG. 13, according to an embodiment.

FIG. 11 is an enlarged perspective view of the fixing member 216 and the shake correction module 214 separated from each other due to the lens module 111 of FIG. 1 protruding out from the front of the photographing apparatus 100, according to another embodiment. FIG. 12 is a cross-sectional view of the fixing member 216 and the shake correction module 214 of FIG. 11, according to an embodiment. FIG. 13 is an enlarged perspective view of the fixing member 216 contacting the shake correction module 214 due to the lens module 111 being received in the lens barrel 110, according to another embodiment. FIG. 14 is a cross-sectional view of the fixing member 216 and the shake correction module 214 of FIG. 13, according to an embodiment.

Referring to FIGS. 11 and 12, according to the current embodiment, a groove 214a is formed on a portion of the shake correction module 214 that contacts the fixing member 216.

When the photographing apparatus 100 is in the "ON" state, the lens module 111 protrudes out from the front of the photographing apparatus 100. In this case, as depicted in FIGS. 11 and 12, the fixing member 216 and the shake correction module 214 are separated from each other.

When the photographing apparatus 100 is shifted into the "OFF" state from the "ON" state, the lens module 111 moves to be received in the lens barrel 110. In this case, as depicted in FIGS. 13 and 14, the fixing member 216 moves toward the shake correction module 214, and is inserted into the groove 214a.

When the fixing member 216 is inserted into the groove 214a, movement of the shake correction module 214 in a direction perpendicular to the optical axis is firmly prevented.

That is, since the shake correction module 214 according to the current embodiment has the groove 214a, the shake correction module 214 can be further correctly fixed.

Besides the configuration, operation, and effect described above, the configuration, operation, and effect according to the current embodiment are the same as those of the previous embodiment, and thus descriptions thereof will not be repeated.

A fixing member 316 and a shake correction module 314 according to another embodiment will now be described with reference to FIGS. 15 through 18; however, mainly differences from the previous embodiments will described.

Figure 15:
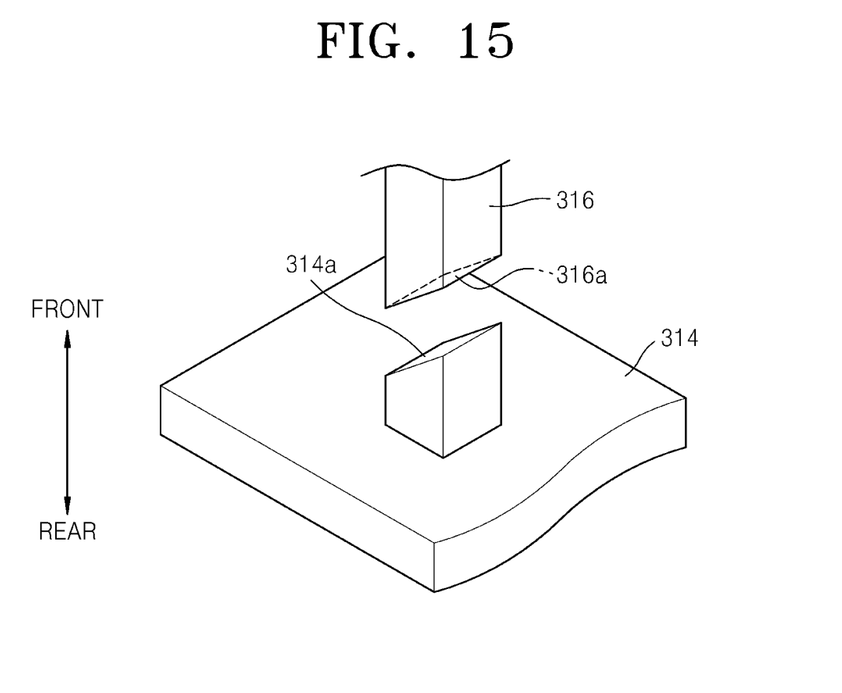
FIG. 15 is an enlarged perspective view of a fixing member and a shake correction module separated from each other due to the lens module protruding out from the front of the photographing apparatus, according to another embodiment.
Figure 16:
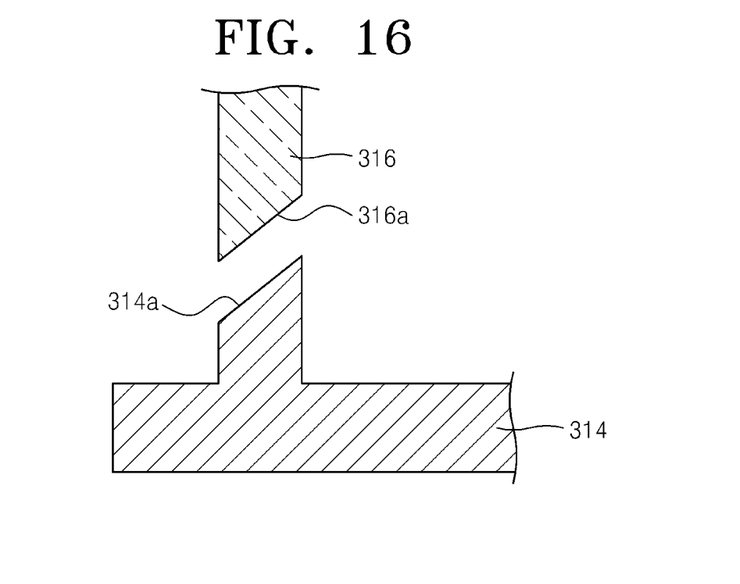
FIG. 16 is a cross-sectional view of the fixing member and the shake correction module of FIG. 15, according to an embodiment.
Figure 17:
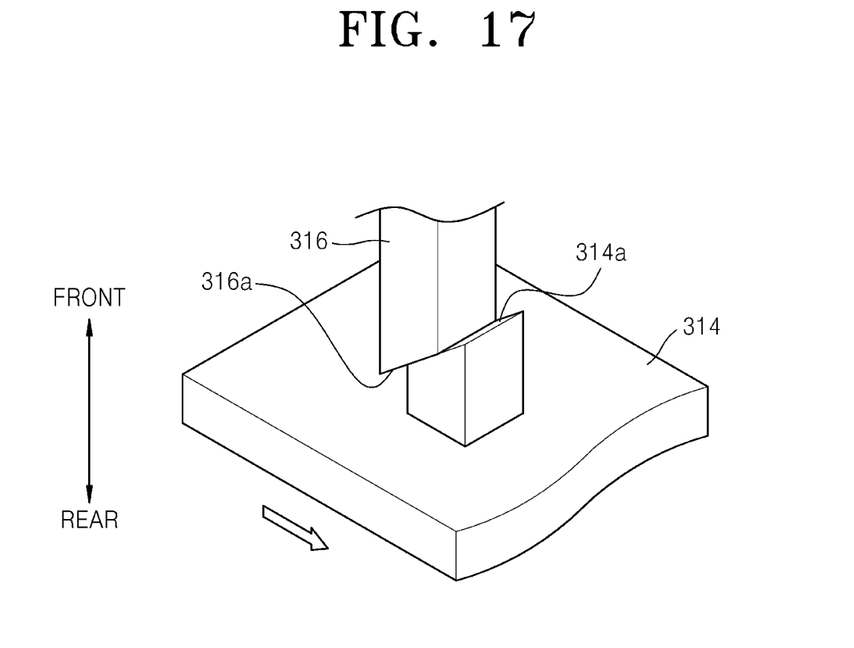
FIG. 17 is an enlarged perspective view of the fixing member contacting the shake correction module due to the lens module being received in the lens barrel, according to another embodiment.
Figure 18:
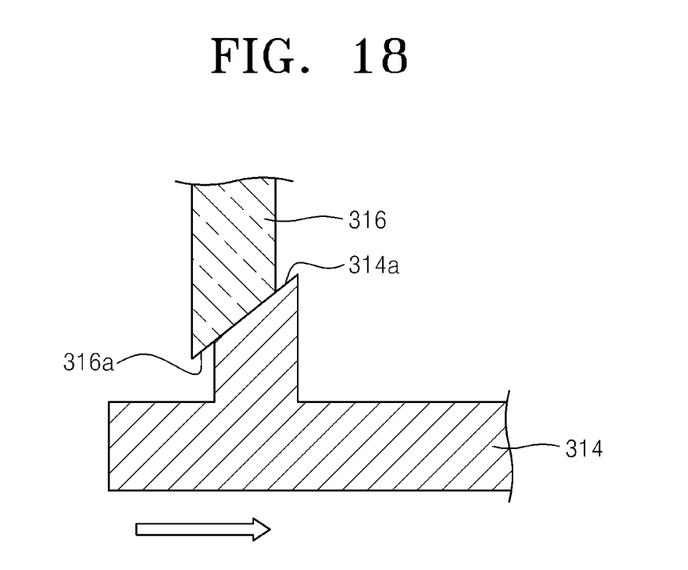
FIG. 18 is a cross-sectional view of the fixing member and the shake correction module of FIG. 17, according to an embodiment.

FIG. 15 is an enlarged perspective view of the fixing member 316 and the shake correction module 314 separated from each other due to the lens module 111 protruding out from the front of the photographing apparatus 100, according to another embodiment. FIG. 16 is a cross-sectional view of the fixing member 316 and the shake correction module 314 of FIG. 15, according to an embodiment. FIG. 17 is an enlarged perspective view of the fixing member 316 contacting the shake correction module 314 due to the lens module 111 being received in the lens barrel 110, according to another embodiment. FIG. 18 is a cross-sectional view of the fixing member 316 and the shake correction module 314 of FIG. 17, according to an embodiment.

Referring to FIGS. 15 and 16, according to the current embodiment, a first inclined surface 314a is formed on a portion of the shake correction module 314 that contacts the fixing member 316, and a second inclined surface 316a is formed on a portion of the fixing member 316 that contacts the first inclined surface 314a of the shake correction module 314.

When the photographing apparatus 100 is in the "ON" state, the lens module 111 protrudes out from the front of the photographing apparatus 100. In this case, as depicted in FIGS. 15 and 16, the first inclined surface 314a of the shake correction module 314 and the second inclined surface 316a of the fixing member 316 are separated from each other.

When the photographing apparatus 100 is shifted from the "ON" state to the "OFF" state, the lens module 111 moves to be received in the lens barrel 110. In this case, as depicted in FIGS. 17 and 18, the first inclined surface 314a contacts the second inclined surface 316a, and thus the first inclined surface 314a slides along the second inclined surface 316a since force is applied to the first inclined surface 314a in a direction indicated by an arrow. Accordingly, the shake correction module 314 moves a predetermined distance in a direction perpendicular to the optical axis.

The shake correction module 314, like the shake correction module 114 of FIG. 6, is mounted on the frame 113 by the elastic supporting unit 115a. However, as described above, when the shake correction module 314 moves in a direction indicated by the arrow, that is, a direction perpendicular to the optical axis, the balance of elastic force of the elastic supporting unit 115a is broken. Accordingly, the shake correction module 314 is biased on a side. At this point, an elastic force for restoring the position of the shake correction module 314 is generated in a direction opposite to the biased direction. However, since the direction of the elastic force and the direction of force generated by the fixing member 316 are opposite to each other, the shake correction module 314 is fixed by the balance of force.

As described above, the fixing member 316 and the shake correction module 314 according to the current embodiment can correctly fix the shake correction module 314 by using a mutual action of the second inclined surface 316a and the first inclined surface 314a.

Besides the configuration, operation, and effect described above, the configuration, operation, and effect according to the current embodiment are the same as those of the other embodiments, and thus descriptions thereof will not be repeated.

The apparatus described herein may comprise a processor (e.g., control unit 131), a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprising," "including," and "having," as used herein, are specifically intended to be read as open-ended terms of art.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

What is claimed is:

1. A lens barrel comprising:
a lens module that comprises at least one lens and moves along an optical axis of the at least one lens;
a shake correction module arranged near the lens module;
at least one fixing member that is disposed between the lens module and the shake correction module and fixes the shake correction module in response to being pressed by the lens module;
a frame on which the at least one fixing member is installed; and
at least one elastic member that elastically mounts the at least one fixing member on the frame,
wherein the shake correction module includes at least one first inclined surface on a portion of the shake correction module that contacts the at least one fixing member, and the at least one fixing member comprises a second inclined surface on a portion of the at least one fixing member that fixes the shake correction module when the second inclined surface contacts the at least one first inclined surface.

2. The lens barrel of claim 1, further comprising:
a lens module moving device that moves the lens module, and
a control unit that controls the lens module moving device.

3. The lens barrel of claim 1, wherein the shake correction module comprises a shake correction lens.

4. The lens barrel of claim 1, wherein the shake correction module comprises an imaging device.

5. The lens barrel of claim 1, wherein at least one groove in which the at least one fixing member is inserted is formed on a portion of the shake correction module that contacts the at least one fixing member.

6. The lens barrel of claim 1, wherein the at least one fixing member has a cylindrical shape.

7. The lens barrel of claim 1, wherein the at least one fixing member includes a contact member on a portion of the at least one fixing member that contacts the shake correction module.

8. The lens barrel of claim 1, wherein a first end of the at least one elastic member is installed on the at least one fixing member and a second end of the at least one elastic member is installed on the frame.

9. The lens barrel of claim 1, wherein the frame includes at least one installation groove into which the at least one fixing member is inserted.

10. The lens barrel of claim 1, wherein the first inclined surface is disposed on a portion of the shake correction module that protrudes from a surface of the shake correction module toward the at least one fixing member.

11. The lens barrel of claim 1, wherein the first inclined surface contacts the second inclined surface when the at least one fixing member fixes the shake correction module in response to being pressed by the lens module.

12. A photographing apparatus comprising:
a lens module that comprises at least one lens and moves along an optical axis of the at least one lens;
a shake correction module arranged near the lens module;
at least one fixing member that is disposed between the lens module and the shake correction module and fixes the shake correction module in response to being pressed by the lens module;
a frame on which the at least one fixing member is installed;
at least one elastic member that elastically mounts the at least one fixing member on the frame;
a lens module moving device that moves the lens module;
a control unit that controls the lens module moving device; and
an imaging device disposed where image light forms an image after passing through the lens module,
wherein the shake correction module includes at least one first inclined surface on a portion of the shake correction module that contacts the at least one fixing member, and the at least one fixing member comprises a second inclined surface on a portion of the at least one fixing member that fixes the shake correction module when the second inclined surface contacts the at least one first inclined surface.

13. The photographing apparatus of claim 12, wherein the shake correction module comprises a shake correction lens.

14. The photographing apparatus of claim 12, wherein the shake correction module comprises the imaging device.

15. The photographing apparatus of claim 12, wherein at least one groove in which the at least one fixing member is inserted is formed on a portion of the shake correction module that contacts the at least one fixing member.

16. The photographing apparatus of claim 12, wherein at least one fixing member has a cylindrical shape.

17. The photographing apparatus of claim 12, wherein the at least one fixing member includes a contact member on a portion of the at least one fixing member that contacts the shake correction module.

18. The photographing apparatus of claim 12, wherein a first end of the at least one elastic member is installed on the at least one fixing member and a second end of the at least one elastic member is installed on the frame.

19. The photographing apparatus of claim 12, wherein the frame includes at least one installation groove into which the at least one fixing member is inserted.

20. The photographing apparatus of claim 12, wherein the first inclined surface is disposed on a portion of the shake correction module that protrudes from a surface of the shake correction module toward the at least one fixing member.

21. The photographing apparatus of claim 12, wherein the first inclined surface contacts the second inclined surface when the at least one fixing member fixes the shake correction module in response to being pressed by the lens module.

22. A lens barrel comprising:
a lens module that comprises at least one lens and moves along an optical axis of the at least one lens;
a shake correction module arranged near and on a rear side of the lens module;
at least one fixing member that is disposed between the lens module and the shake correction module and fixes the shake correction module in response to being pressed by the lens module;
a frame on which the at least one fixing member is installed; and
at least one elastic member that elastically mounts the at least one fixing member on the frame,
wherein the shake correction module includes at least one first inclined surface on a portion of the shake correction module that contacts the at least one fixing member, and the at least one fixing member comprises a second inclined surface on a portion of the at least one fixing member that fixes the shake correction module when the second inclined surface contacts the at least one first inclined surface.

* * * * *